United States Patent [19]

Waldrop

[11] 4,391,363

[45] Jul. 5, 1983

[54] AUTOMATIC LATCH FOR UNLOADING AUGER

[75] Inventor: T. William Waldrop, New Holland, Pa.

[73] Assignee: Sperry Corporation, New Holland, Pa.

[21] Appl. No.: 235,395

[22] Filed: Feb. 18, 1981

[51] Int. Cl.³ .............................................. B65G 21/10
[52] U.S. Cl. ................................... 198/865; 198/320; 198/548; 414/504; 414/526; 366/186
[58] Field of Search ............... 198/313, 320, 632, 666, 198/668, 865, 545, 555, 548, 558, 536; 414/319, 320, 505, 526, 504, 326, 332; 366/50, 186, 603; 241/101 B

[56] References Cited

U.S. PATENT DOCUMENTS 3,638,816  2/1972  Mann .................................... 414/526
4,000,805  1/1977  Hadler .................................. 198/320

Primary Examiner—Joseph E. Valenza
Attorney, Agent, or Firm—Darrel F. Marquette; Frank A. Seemar; Larry W. Miller

[57] ABSTRACT

A movable unloading auger is automatically latched and unlatched with respect to a support member by connecting a lifting winch and cable to a movable latch arm attached to the auger, thus advantageously permitting hands-off latching and unlatching operations. A latch pin is extended from the latch arm and is guided to obstruct movement of the auger relative to the support member.

7 Claims, 3 Drawing Figures

U.S. Patent  Jul. 5, 1983  4,391,363
Fig. 1
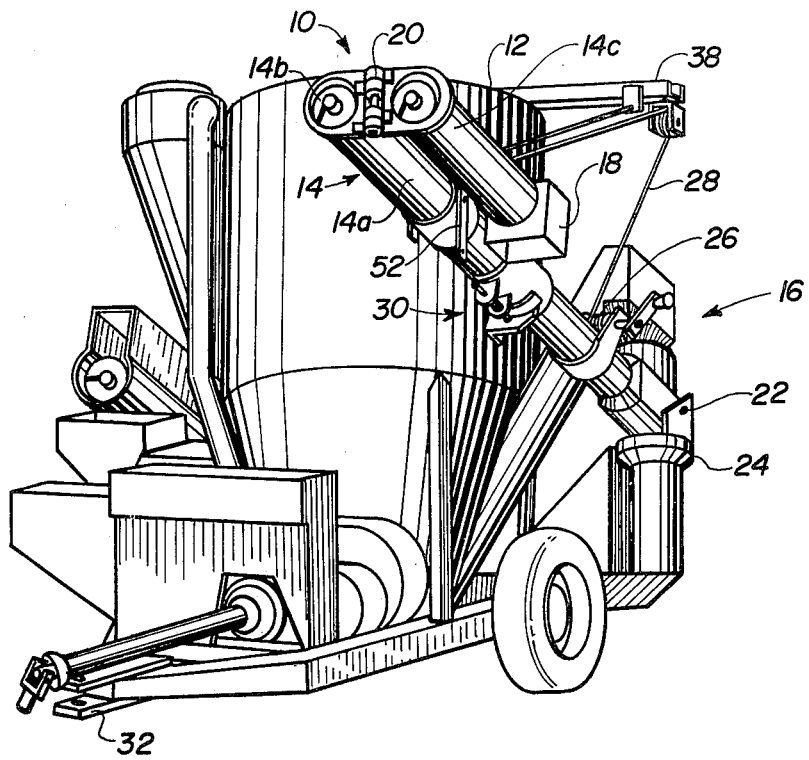
Fig. 2
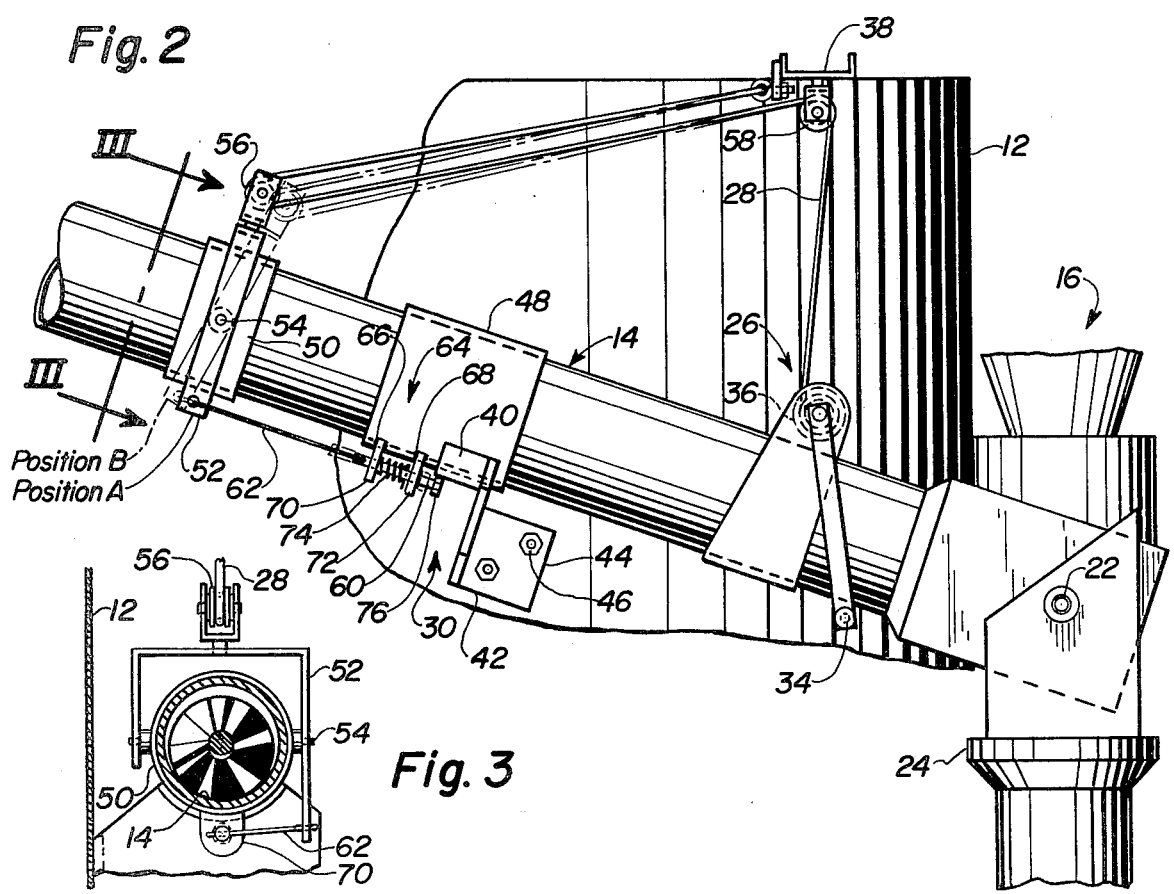
Fig. 3

AUTOMATIC LATCH FOR UNLOADING AUGER

BACKGROUND OF THE INVENTION

This invention relates generally to solid material comminution apparatus of the mill or mixer type and more particularly to an automatic latch for the unloading auger of an agricultural grinder-mixer.

Grinder-mixers are well known agricultural devices for grinding and mixing various grains and grasses into a suitable feed mix for feeding livestock. Once the feed is ground and mixed it is conveyed, via an unloading auger, to a feeding or a storage location.

The unloading auger is attached to the grinder-mixer for movement which permits up and down pivoting as well as side-to-side swinging. When the auger is not in use, and particularly when the grinder-mixer is being transported, it is important to secure the auger to limit movement thereof which could result in substantial hazard and damage.

Typically, an auger support provides a rest position for the auger and a latch secures the auger on the support. When the auger is to be used, the latch is manually released so that the auger can be raised or lowered and swung in an arcuate path relative to the grinder-mixer. A winch, in combination with a cable and one or more pulleys, is used to raise or lower the auger. When the auger is not in use, the auger is returned to the auger support and a latch is manually engaged to secure the auger on the support.

Manual release and engagement of the latch is undesirable for several reasons. It is time consuming, the latch is usually positioned for limited access so that the operator must climb and reach, and the operator is often required to release and engage the latch while simultaneously operating the winch. The latter is difficult because the winch and latch are usually at remote locations on the auger.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing an automatic latch for a movable auger used for unloading material generally from a container and more particularly for unloading crop material from agricultural machinery such as a grinder-mixer. A support member is provided for supporting the auger. A movable latch arm is mounted on the auger. A latch pin extends from the latch arm. The latch pin is guided and retained in a first obstructive position relative to and adjacent said support member. A winch and first cable are operably connected to move the latch arm between the first position and a second obstruction free position relative to the support member. A resilient member urges the latch pin to the first position. Means are provided for limiting movement of the latch pin in the second position.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is an isometric view illustrating an exemplary grinder-mixer utilizing an embodiment of the latching apparatus of this invention;

FIG. 2 is a diagrammatic view illustrating an embodiment of this invention; and

FIG. 3 is a view illustrating an embodiment of this invention viewed from line III—III.

DESCRIPTION OF THE PREFERRED EMBODIMENT

Referring to the drawings, FIG. 1 illustrates a commercially available agricultural grinder-mixer generally designated 10 and including a large container portion 12 wherein crop material is mixed. The resulting mix can be unloaded via a discharge device commonly called an unloading auger 14. As it is well known, auger 14 is an elongated tubular device 14a having an auger-like member 14b rotatably mounted therein for moving material from an infeed end 16 and outwardly through a spout 18. Often, as shown in FIG. 1, such unloading augers 14 include an extension 14c pivotally connected at 20 thus permitting a reduction in the overall length of the unloading auger.

It is well-known that infeed end 16 is pivotally and rotatably connected at 22,24, respectively, to grinder-mixer 10. This permits spout 18 to be directed to a desired position for discharge of the crop material. Also, well-known is the fact that a winch 26 and cable 28 combination are operably connected for raising and lowering unloading auger 14 relative to a support member 30 connected to grinder-mixer 10 for supporting auger 14 in a "stored" position when not in use, such as when grinder-mixer 10 is to be transported, usually by a tow connected at tow bar 32. As illustrated in FIGS. 1 and 2, winch 26 is attached to auger 14 and includes a rotatable handle 34 for winding cable 28 on a drum 36. Cable 28 is connected to both the auger 14 and the grinder-mixer 10 (at a support 38) and through varying a number of pulleys and cable strands, mechanical advantage can be controlled.

Support member 30, FIGS. 1 and 2, generally includes a fabricated steel cradle portion 40 having a generally arcuate shape of a construction sufficient for receiving auger 14. A steel brace 42 is connected by welding or the like to cradle 40, and extends to include a flange 44 which is attached to container 12 by bolts 46 or the like.

An annular steel reinforcing collar 48, FIG. 2, is attached by welding to auger 14. Collar 48 is positioned on auger 14 for seating alignment with cradle 40. Another annular steel reinforcing collar 50 is similarly attached to auger 14 and spaced from collar 48. A generally U-shaped steel latch arm member 52, see FIGS. 2 and 3, is pivotally connected to collar 50 at pivot pins 54 for pivoting from a first (solid line) position A to a second (dotted line) position B.

Referring also to FIGS. 2 and 3, a pulley 56 is appropriately connected to latch arm member 52. Cable 28 extends from drum 36, via another pulley 58 connected to support 38, around pulley 56 and terminates at support 38. As previously stated, the number of pulleys and cable strands can be varied to control the mechanical advantage desired.

A steel cylindrical latch pin 60 is connected to extend from latch arm 52. Preferably, a flexible member such as another cable 62, similar to cable 28 is used to interconnect pin 60 and latch arm 52. However, a rigid section of rod can be used in place of cable 62, but the rod should be pivotally connected at its opposite ends to the latch arm 52 and the pin 60.

Guide means 64 is provided for guiding latch pin 60 and retaining the pin adjacent to and in a first obstructive position relative to support member 30. By obstruction position is meant that, the position of pin 60 relative to support 30 is an obstruction to the movement of auger 14 into or out of cradle 40. Guide means 64 includes first and second spaced apart steel plates 66,68 preferably welded to collar 48. Plates 66,68 include aligned apertures 70,72 respectively, for receiving pin 60.

Winch 26 and cable 28 provide a means for raising and lowering auger 14 relative to support 30. Thus, a tensioning force applied to cable 28 will tend to pivot latch arm 52 from position A to position B which simultaneously moves pin 60 from the first obstruction position to and a second, obstruction free, position relative to support 30. By obstruction free is meant that, the position of pin 60 relative to support 30 is not an obstruction to the movement of auger 14 into or out of cradle 40. When such tensile force is removed and cable 28 becomes relaxed, such as when auger 14 is seated in cradle 40, a resilient means, such as a steel compression spring 74, urges latch pin 60 and latch arm 52 from the second to the first position. Spring 74 is connected to move with pin 60 between plates 66,68.

Means, such as a steel stop member 76, is connected to an end of pin 60 adjacent to plate 68 and support 30, for limiting movement of pin 60 to the second position.

With the parts assembled as set forth above it can be seen that movement of handle 34, such as to apply a tensile force to cable 28, will raise auger 14 out of cradle 40. Due to the connection of cable 28 to latch arm 52, and the interconnection of latch 52 with pin 60 by cable 62, latch arm 52 is pivoted and pin 60 is moved a distance, limited by stop 76 but sufficient for moving pin 60 to the obstruction free position relative to support 30. Thus, auger 14 is automatically unlatched.

When auger 14 is lowered to rest in cradle 40, cable 28 becomes relaxed and spring 74 urges pin 60 to return to the obstruction position. Thus auger 14 is automatically latched.

The foregong has described an automatic latching apparatus for use with an auger used for unloading material from a container.

It is anticipated that aspects of the present invention, other than those specifically defined in the appended claims, can be obtained from the foregoing description and the drawings.

Having thus described the invention, what is claimed is:

1. In combination with a container having a movable unloading auger, the improvement comprising:
   means for supporting said auger, said means being a support member connected to said container and extending therefrom;
   a latch arm pivotally mounted on said auger;
   a latch pin connected to said latch arm;
   means for guiding said latch pin to a first obstruction position relative to said support member;
   means connected for raising and lowering said auger, said means including a cable operably connected to pivot said latch arm to move said latch pin between said first position, and a second obstruction free position relative to said support member;
   resilient means for urging said latch pin from said second to said first position;
   means for limiting movement of said latch pin to said second position;
   said latch pin being moved from said first position to said second position when the tension in said cable overcomes the force of said resilient means; and
   said latch pin being moved from said second position to said first position when the force of said resilient means overcomes the tension in said cable.

2. The apparatus of claim 1 wherein said latch pin guide includes first and second spaced apart plates mounted on said auger, each plate having relatively aligned apertures formed therein.

3. The apparatus of claim 2 wherein said resilient means is connected to said latch pin between said plates.

4. The apparatus of claim 1 wherein said means for limiting movement is a stop member attached to said latch pin.

5. The apparatus of claim 1 wherein said latch arm and said latch pin are interconnected by another cable.

6. The apparatus of claim 1 wherein said latch pin guide includes first and second spaced apart plates mounted on said auger, each plate having relatively aligned apertures formed therein, said resilient means is connected to said latch pin between said plates, said means for limiting movement is a stop member attached to said latch pin adjacent said support member, and said latch arm and said latch pin are interconnected by another cable.

7. An agricultural grinder-mixer comprising:
   an unloading auger movably connected to the mixer,
   means for supporting said auger, said means being a support member connected to and extending from said mixer;
   a latch arm pivotally mounted on said auger;
   means connected for raising and lowering said auger relative to said support, said means being a winch and cable operably connected to pivot said latch arm;
   a latch pin connected to said latch arm;
   means for guiding said latch pin to a first obstruction position relative to said support member, said latch pin extended through an aperture in said guide means, said latch pin including a stop means for limiting movement of said pin in response to engagement with said guide means;
   resilient means connected to said pin for engagement with said guide means and for urging said pin to said first position relative to said support member; and
   means connected for moving said latch pin to a second obstruction free position relative to said support member in response to movement of said winch and cable, said means including member interconnecting said latch pin with said latch arm;
   said latch pin being moved from said first position to said second position when the tension in said cable overcomes the force of said resilient means; and
   said latch pin being moved from said second position to said first position when the force of said resilient means overcomes the tension in said cable.

* * * * *